US012110734B2

(12) United States Patent
Bagnall et al.

(10) Patent No.: US 12,110,734 B2
(45) Date of Patent: *Oct. 8, 2024

(54) DRAINABLE THRESHOLD

(71) Applicant: Inverge, LLC, Temecula, CA (US)

(72) Inventors: Jan Calvin Bagnall, Murietta, CA (US); Jeff Daniel Zember, Temecula, CA (US)

(73) Assignee: INVERGE, LLC, Temecula, CA (US)

( * ) Notice: Subject to any disclaimer, the term of this patent is extended or adjusted under 35 U.S.C. 154(b) by 444 days.

This patent is subject to a terminal disclaimer.

(21) Appl. No.: 17/579,464

(22) Filed: Jan. 19, 2022

(65) Prior Publication Data

US 2022/0145694 A1 May 12, 2022

Related U.S. Application Data

(63) Continuation of application No. 16/573,798, filed on Sep. 17, 2019, now Pat. No. 11,230,875.

(60) Provisional application No. 62/822,568, filed on Mar. 22, 2019, provisional application No. 62/733,221, filed on Sep. 19, 2018.

(51) Int. Cl.
*E06B 1/70* (2006.01)
*E06B 7/14* (2006.01)

(52) U.S. Cl.
CPC . *E06B 1/70* (2013.01); *E06B 7/14* (2013.01)

(58) Field of Classification Search
CPC .......................................................... E06B 1/70
See application file for complete search history.

(56) References Cited

U.S. PATENT DOCUMENTS

| | | | | |
|---|---|---|---|---|
| 582,451 A * | 5/1897 | Brannon | E06B 1/70 | 49/471 |
| 1,207,827 A | 12/1916 | Winters | | |
| 2,108,137 A | 2/1938 | Oftedal et al. | | |
| 2,167,958 A * | 8/1939 | Oftedal | E06B 1/70 | 49/470 |

(Continued)

FOREIGN PATENT DOCUMENTS

| | | |
|---|---|---|
| DE | 202015104176 U1 | 12/2016 |
| EP | 2431560 A1 | 3/2012 |

(Continued)

OTHER PUBLICATIONS

Assa Abloy “Pemko 259_Ramp Threshold” Product Catalogue [online]. Dec. 24, 2017 17 [retrieved Nov. 18, 2019]. URL: https://www.assaa bloydooraccessories.us/enlproductslthresholds-ramps/modular-rampslbarrierfree-ramp-thresholds/2591/>; first illustration.

(Continued)

*Primary Examiner* — Catherine A Kelly
(74) *Attorney, Agent, or Firm* — Procopio, Cory, Hargreaves & Savitch LLP

(57) ABSTRACT

An entry door drainable threshold comprises a front section including one or more water egress apertures; a trough section including one or more apertures; and a water ramp member disposed under the trough section and the front section, whereby water falls down through the one or more apertures of the trough section, down the water ramp member, and out of the entry door drainable threshold through the one or more water egress apertures.

21 Claims, 8 Drawing Sheets

(56) References Cited

U.S. PATENT DOCUMENTS

| | | | | | |
|---|---|---|---|---|---|
| 2,851,744 | A * | 9/1958 | Oehmig | E06B 7/2309 | D25/60 |
| 4,055,917 | A * | 11/1977 | Coller | E06B 7/2309 | 49/469 |
| 4,310,991 | A | 1/1982 | Seely | | |
| 5,067,279 | A | 11/1991 | Hagemeyer | | |
| 5,706,607 | A | 1/1998 | Frey | | |
| 5,956,909 | A | 9/1999 | Chou | | |
| 6,289,635 | B1 | 9/2001 | Procton et al. | | |
| 7,066,685 | B2 * | 6/2006 | Humphries | E03F 5/06 | 210/163 |
| 7,669,369 | B2 | 3/2010 | Procton et al. | | |
| 7,930,856 | B2 * | 4/2011 | Hooper, Jr. | E05D 15/066 | 49/411 |
| 7,960,856 | B2 | 4/2011 | Hooper | | |
| 8,033,056 | B2 | 10/2011 | Wernlund et al. | | |
| 8,276,320 | B2 | 10/2012 | Erbrect | | |
| 8,336,268 | B2 * | 12/2012 | Delaquis | E03C 1/122 | 52/302.1 |
| 8,448,384 | B2 | 5/2013 | Wernlund | | |
| D797,309 | S | 9/2017 | Jaskiewicz et al. | | |
| 10,370,891 | B2 | 7/2019 | Farahmandpour | | |
| 10,895,103 | B2 | 8/2021 | Alkhoury | | |
| 2002/0078641 | A1 | 6/2002 | Procton et al. | | |
| 2002/0194787 | A1 | 12/2002 | Bennett | | |
| 2013/0199102 | A1 | 8/2013 | Rager-Frey | | |
| 2014/0260011 | A1 | 9/2014 | Pettibone | | |
| 2017/0234060 | A1 | 8/2017 | Graetsch | | |
| 2018/0087260 | A1 | 3/2018 | Priester | | |

FOREIGN PATENT DOCUMENTS

| | | | |
|---|---|---|---|
| GB | 505992 | | 5/1939 |
| GB | 2297112 | A | 7/1996 |
| GB | 2381287 | A | 4/2003 |
| GB | 2385877 | A | 9/2003 |
| JP | 2000303523 | A | 10/2000 |

OTHER PUBLICATIONS

International Search Report and Written Opinion dated Dec. 11, 2019 for corresponding application PCT/US19/51591 (9 pages).

* cited by examiner

DRAINABLE THRESHOLD

FIELD OF THE INVENTION

The present invention relates to door thresholds.

SUMMARY OF THE INVENTION

An aspect of the invention involves an entry door drainable threshold. The threshold includes a trough which is positioned on top of a body. The body includes structural support features, screw holes and a built-in ramp that directs incoming water out to the front of the threshold. The body also includes "shim" structures which adapt the edge of the body to the adjacent floor, such that the threshold complies with the ADA.

Another aspect of the invention involves an entry door drainable threshold comprises a front section including one or more water egress apertures; a trough section including one or more apertures; and a water ramp member disposed under the trough section and the front section, whereby water falls down through the one or more apertures of the trough section, down the water ramp member, and out of the entry door drainable threshold through the one or more water egress apertures.

One or more implementations of the aspect of the invention described immediately above includes one or more of the following: the entry door drainable threshold has a two-piece construction comprised of a threshold ramp and a threshold cap; the entry door drainable threshold includes an anti-skid profile; the anti-skid profile includes one or more of ridges and bumps; the entry door drainable threshold includes a drainage flow rate of at least 2.3 gallons per minute per 3 foot section; the front section includes an inclined upper surface and a horizontal upper surface; the water ramp member includes an upper end and the trough section includes apertures disposed above the upper end of the water ramp member; the trough section includes elongated recesses with the apertures therein and elongated ridges separating the elongated recesses; the elongated ridges are T-shaped elongated ridges; one or more apertures of the trough section are longitudinally aligned with one or more water egress apertures of the front section; the one or more apertures of the trough section and the one or more water egress apertures of the front section are slots; a rear section; the rear section includes an inclined upper surface and a horizontal upper surface with elongated ridges; the rear section includes a rear having a rear supporting section with a flat undersurface that rests on underlying floor; horizontal upper surface includes an underside having a downwardly extending vertical ridge and a downwardly extending rear wall that form an elongated receiving recess, and the water ramp member includes an upper portion received in the elongated receiving recess to secure the threshold ramp and the threshold cap together; the threshold ramp includes an elongated base flange that rests on an underlying floor; the threshold has a height no greater than ½ in; and/or the threshold is made of extruded aluminum.

A further aspect of the invention involves a method of using the entry door drainable threshold of the aspect of the invention described further above, and comprises receiving water through the one or more apertures of the trough section; draining the water down the water ramp member; and emitting the water out of the entry door drainable threshold through the one or more water egress apertures.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

Figure 1:
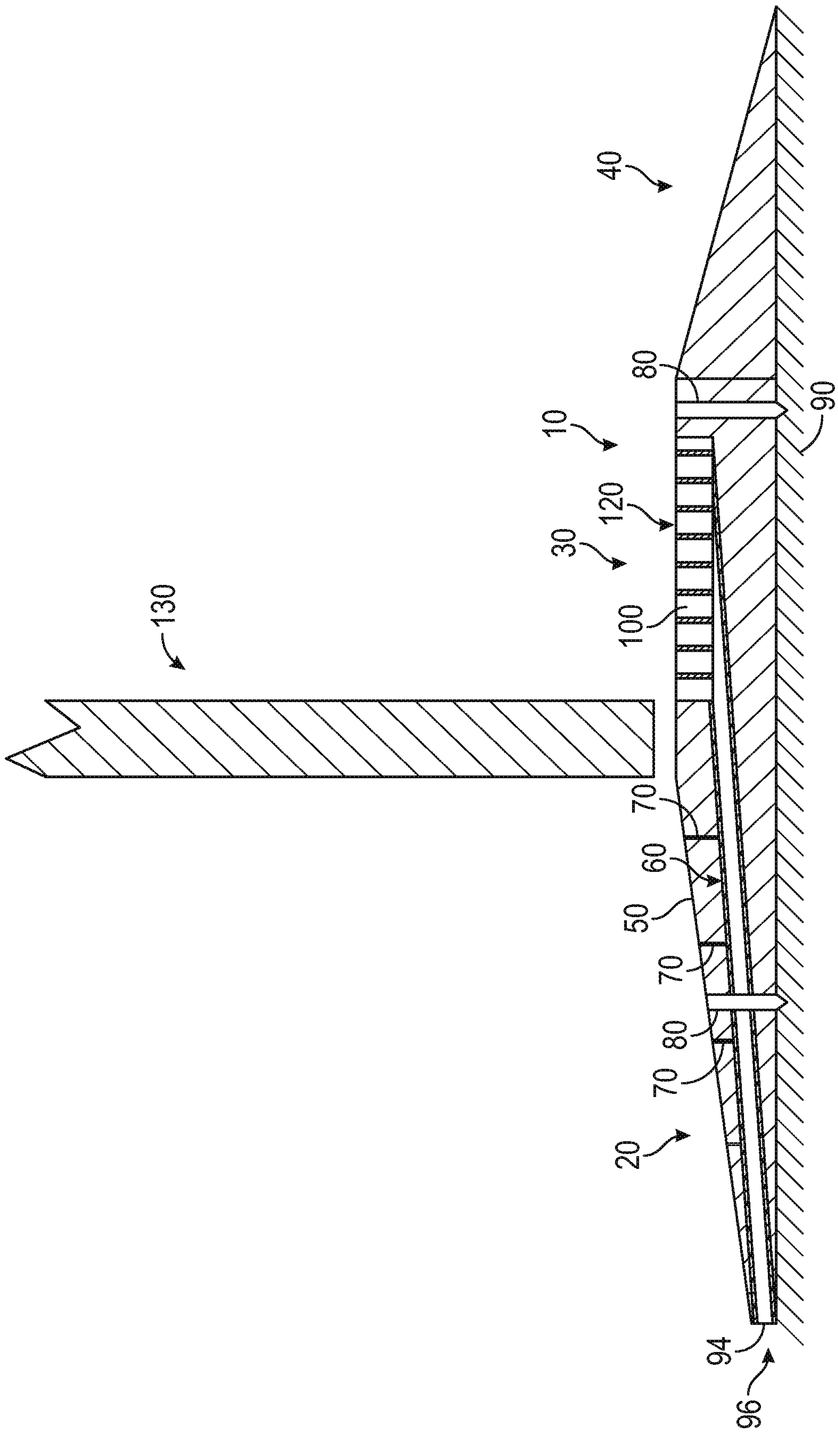
FIG. 1 is a cross-sectional view of an entry door drainable threshold shown with a door above the threshold.
Figure 2:
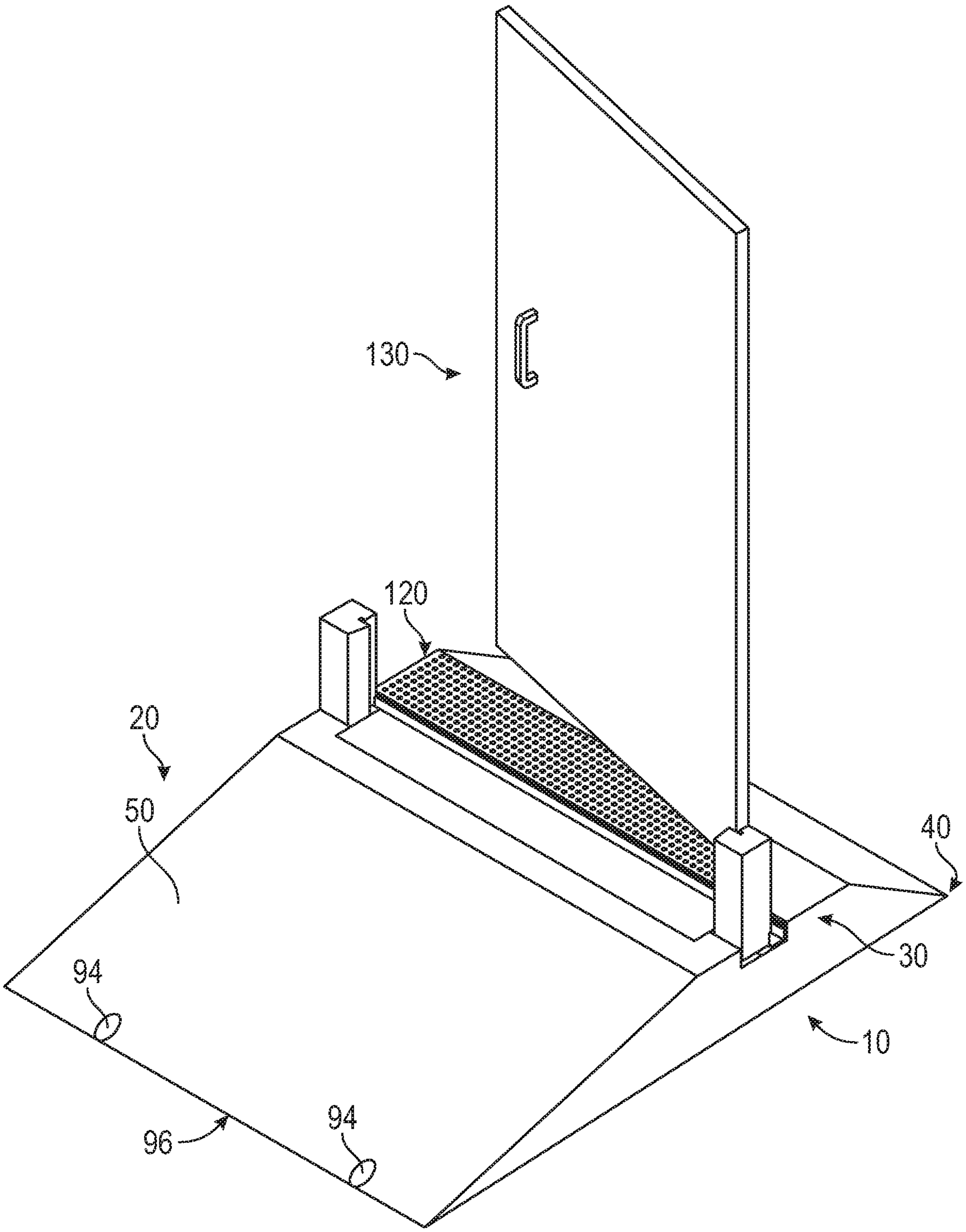
FIG. 2 is a perspective view of the entry door drainable threshold with the door shown in a slightly open position.

With reference to FIGS. 1 and 2, an embodiment of an entry door drainable threshold ("threshold") 10 will be described.

The threshold 10 includes an outer/front section 20, an inner/rear section 30, and a shim member 40 that is connected to the inner/rear section 30.

The outer/front section 20 includes an inclined upper surface 50, a water ramp 60 under the included upper surface 50, vertical supports 70 running between the inclined upper surface 50 and the water ramp 60 for structural strength, supporting the inclined upper surface 50, and one or more vertical funnel-shaped fastener hole(s) 80 that receive fastener(s) for attachment of the threshold 10 to an underlying floor/substrate 90. Drainage hole(s) 94 in communication with the water ramp 60 are disposed at a front end 96 of the outer/front section 20.

The inner/rear section 30 includes a trough-receiving section/recess 100 that communicates with an upper end of the water ramp 60 for directing incoming water out to the front of the threshold. The inner/rear section 30 includes one or more vertical funnel-shaped fastener hole(s) 80 that receive fastener(s) for attachment of the threshold 10 to the underlying floor/substrate 90. A rectangular trough 120 is received in the trough-receiving section/recess 100.

The shim member 40 adapts the edge(s) of the inner/rear section 30 to the adjacent substrate/floor 90 (shim member 40 transcends down on all edges/sides of the inner/rear section 30) such that the threshold 10 complies with the Americans with Disabilities Act (ADA). The shim member 40 is adaptable to whatever flooring that is being installed in the commercial structure. In an alternative embodiment, such as in a tile application, where the tile is laid up adjacent to the edge(s) of the inner/rear section 30, the threshold 10 does not include the shim member 40.

In use, water that gets past a door 130 will fall into the trough 120 that is inside and under the door 130/commercial structure. The water then travels down the water ramp 60 and makes its way out of the commercial structure to the front of the threshold 10 through the drainage holes 94.

Figure 3:
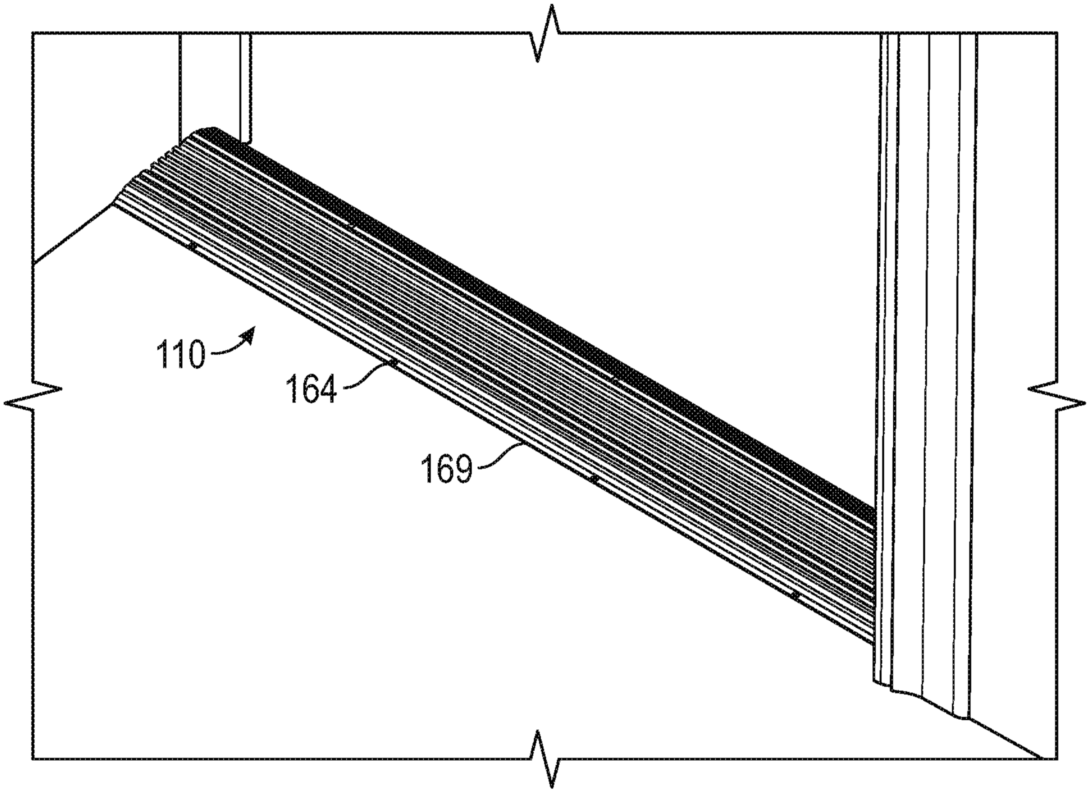
FIG. 3 is a perspective view of another embodiment of an entry door drainable threshold shown with a door open relative to the threshold.
Figure 4:
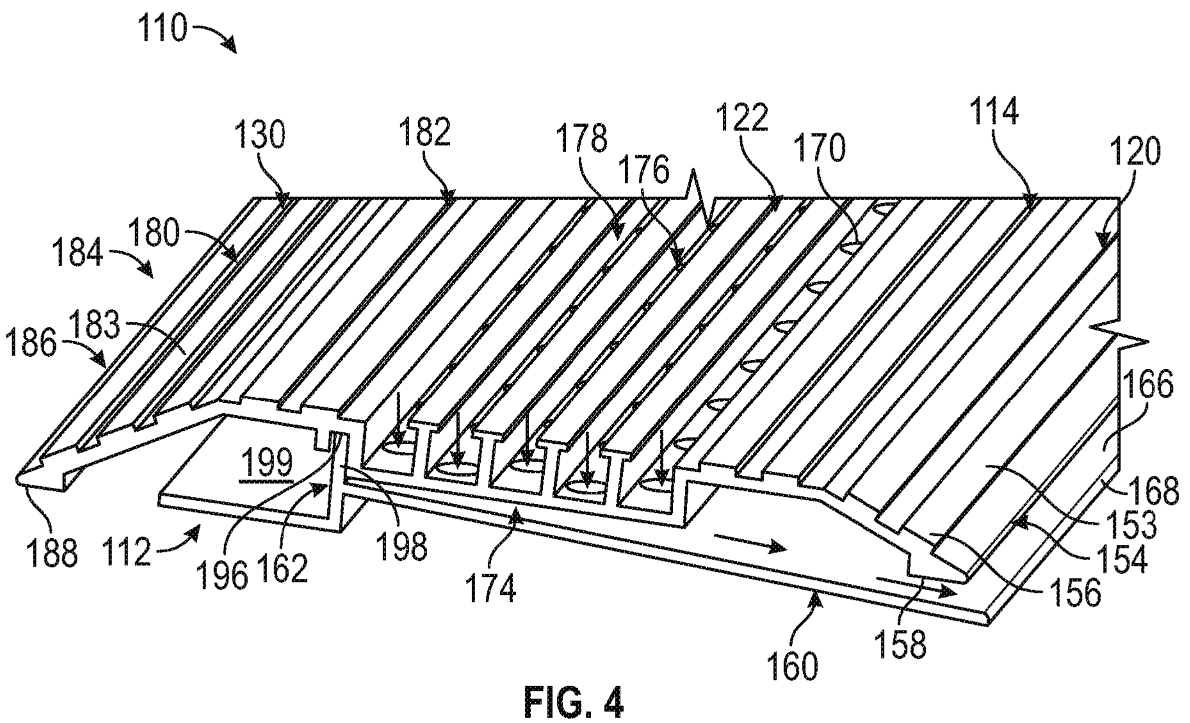
FIG. 4 is an enlarged perspective view the entry door drainable threshold of FIG. 3.
Figure 5:
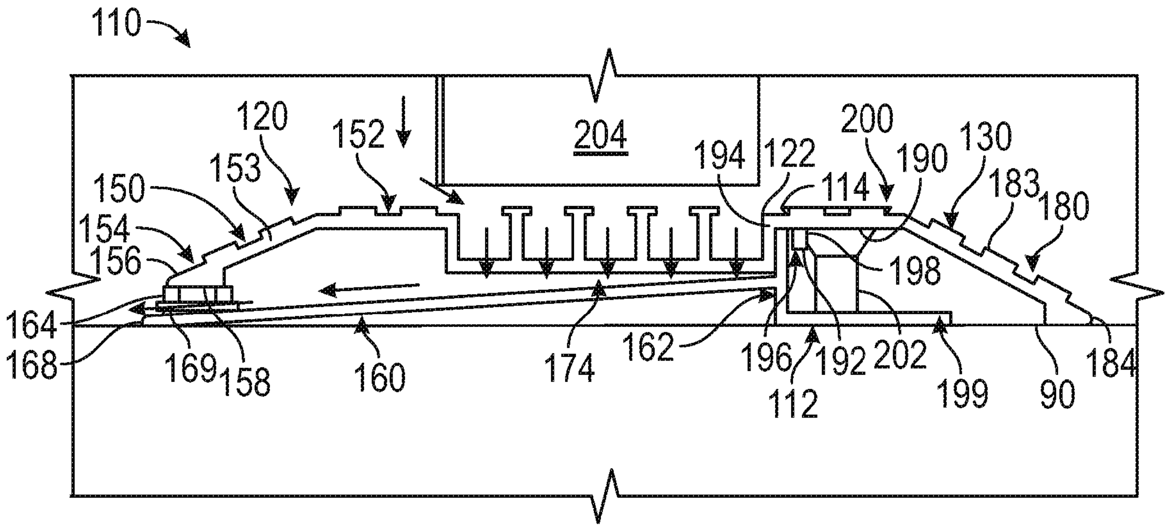
FIG. 5 is a cross-sectional view of the entry door drainable threshold of FIG. 3 with the door above the threshold.

With reference to FIGS. 3-5, another embodiment of an entry door drainable threshold ("threshold") 110 for commercial and industrial applications (meeting American Disabilities Act (ADA) requirements), warehouse/loading roll up doors, and for any other door opening will be described.

The threshold 110 has a two-piece construction comprised of a threshold ramp 112 and a threshold cap 114 disposed over and on the threshold ramp 112. This construction, which is described in more detail below, allows the threshold 110 to have a low profile, not to exceed ½ in. in height, and, thus, making it American Disabilities Act (ADA) compliant. The threshold 110 includes an outer/front section 120, an intermediate trough section 122, and an inner/rear section 130.

The outer/front section 120 includes an inclined upper surface 150 and a horizontal upper surface 152 with an anti-skid profile (e.g., bumps, elongated ridges) 153 thereon. A front 154 of the inclined upper surface 150 includes a front supporting section 156 with a flat undersurface 158. An inclined water ramp member 160 extends outwardly/forwardly from a vertical ramp member 162, under the outer/front section 120 and the intermediate trough section 122 of the threshold cap 114. Spacer supports 164 are disposed between the flat undersurface 158 of the front supporting section 156 and an upper surface 166 of a front 168 of the inclined water ramp member 160 so as to form water egress holes/spaces 169 along the front of the outer/front section 120.

The intermediate trough section 122 includes holes 170 therein for communicating with an upper end 174 of the water ramp member 160 for directing incoming water out to the front of the threshold 100 as shown in FIGS. 4 and 5. The intermediate trough section 122 includes elongated recesses 176 with the holes 170 therein and are separated by elongated T-shaped ridges 178, which also form an anti-skid profile.

The inner/rear section 130 includes an inclined upper surface 180 and a horizontal upper surface 182 with elongated ridges 183 that also form an anti-skid profile thereon. A rear 184 of the inner/rear section 130 includes a rear supporting section 186 with a flat undersurface 188 that rests on underlying floor/substrate 90. An underside 190 of the horizontal upper surface 182 includes a downwardly extending vertical ridge 192 that, along with a downwardly extending rear wall 194 of the intermediate trough section 122, forms an elongated receiving recess 196 that receives an upper portion 198 of the vertical ramp member 162 to secure the threshold ramp 112 and the threshold cap 114 relative to each other. The threshold ramp 112 includes elongated base flange 199 that rests on underlying floor/substrate 90. The horizontal upper surface 182 includes one or more vertical funnel-shaped fastener hole(s) 200 that receive fastener(s) 202 for attachment of the threshold 110 to the underlying floor/substrate 90.

In use, water that gets past a door 204 (e.g., hinged door, warehouse/loading roll up door) will fall into the elongated recesses 176 of the intermediate trough section 122 and through the holes 170 therein. The water then travels down the water ramp member 160 and makes its way out of the commercial structure to the front of the threshold 110 through the water egress holes/spaces 169 along the front of the outer/front section 120. Drainage in the threshold 110 averages 2.3 gallons per minute per 3 foot section.

Figure 6:
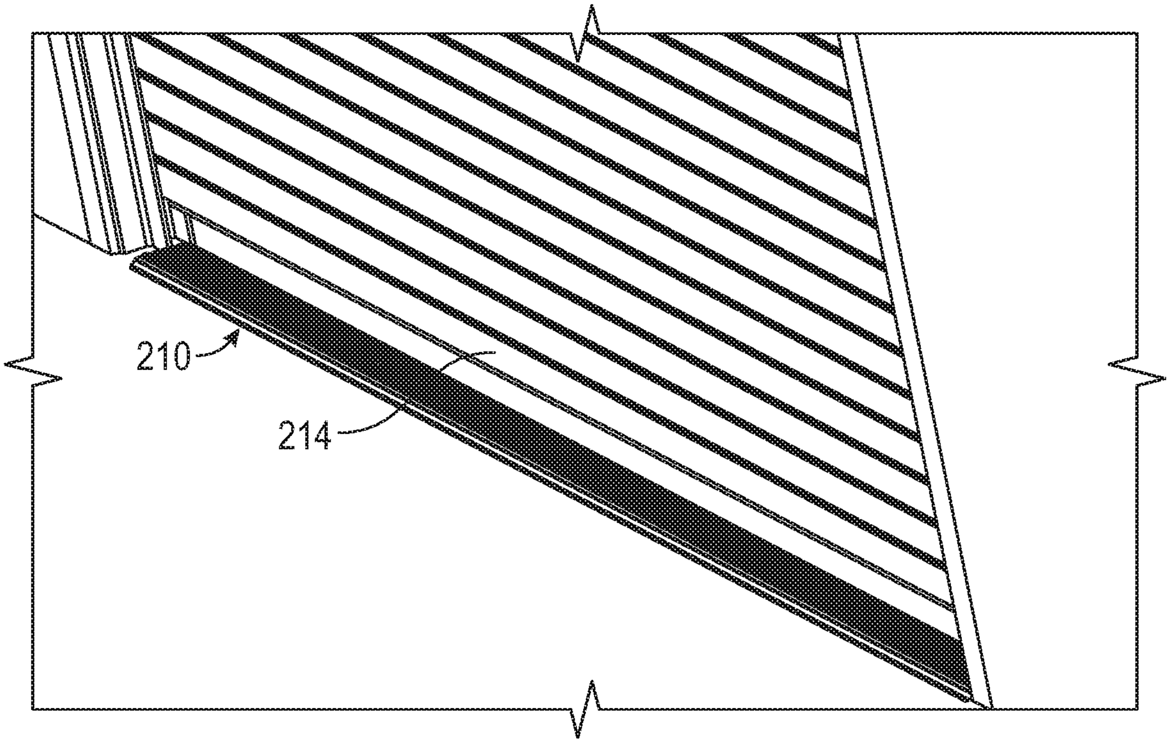
FIG. 6 is a perspective view of another embodiment of a door drainable threshold shown with a roll up door slightly open relative to the threshold.
Figure 7:
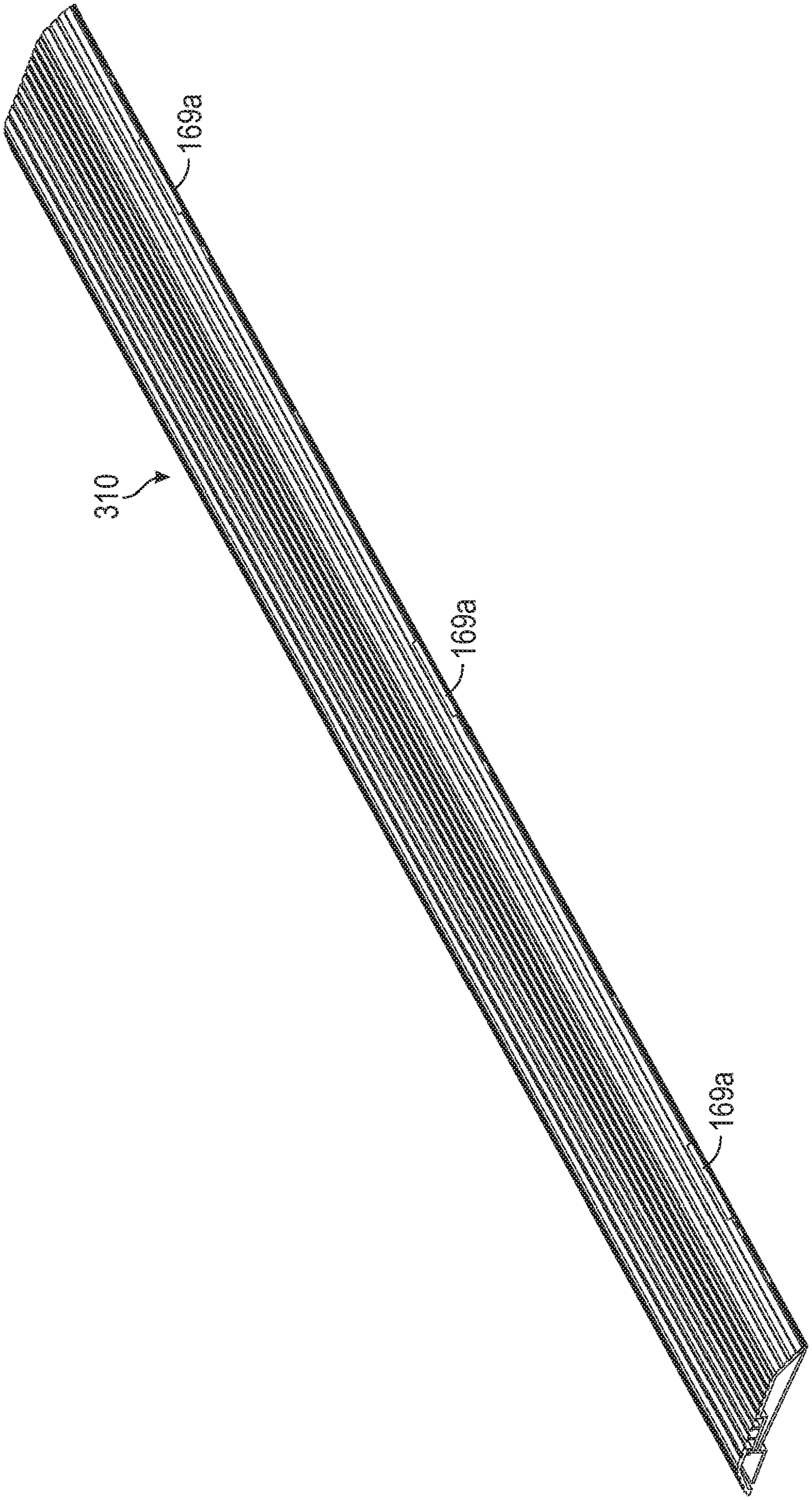
FIG. 7 is an enlarged perspective view of another embodiment of an entry door drainable threshold.
Figure 8:
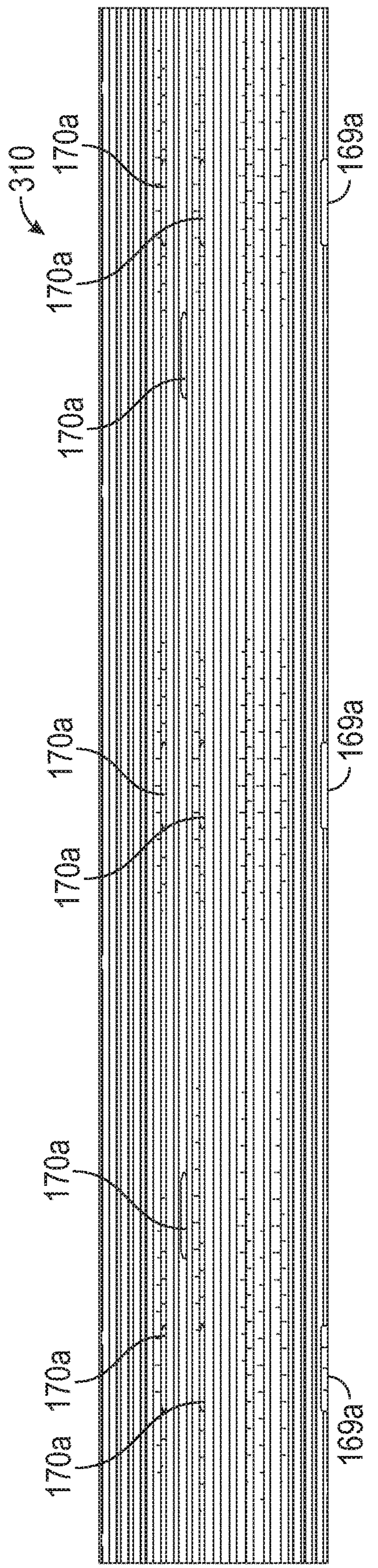
FIG. 8 is top plan view of the entry door drainable threshold of FIG. 7.
Figure 9:
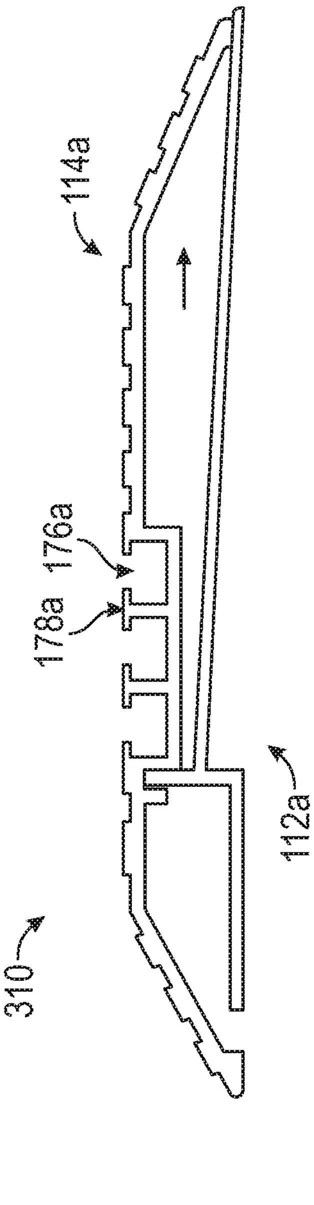
FIG. 9 is an enlarged perspective view of the entry door drainable threshold of FIGS. 7 and 8.
Figure 10:
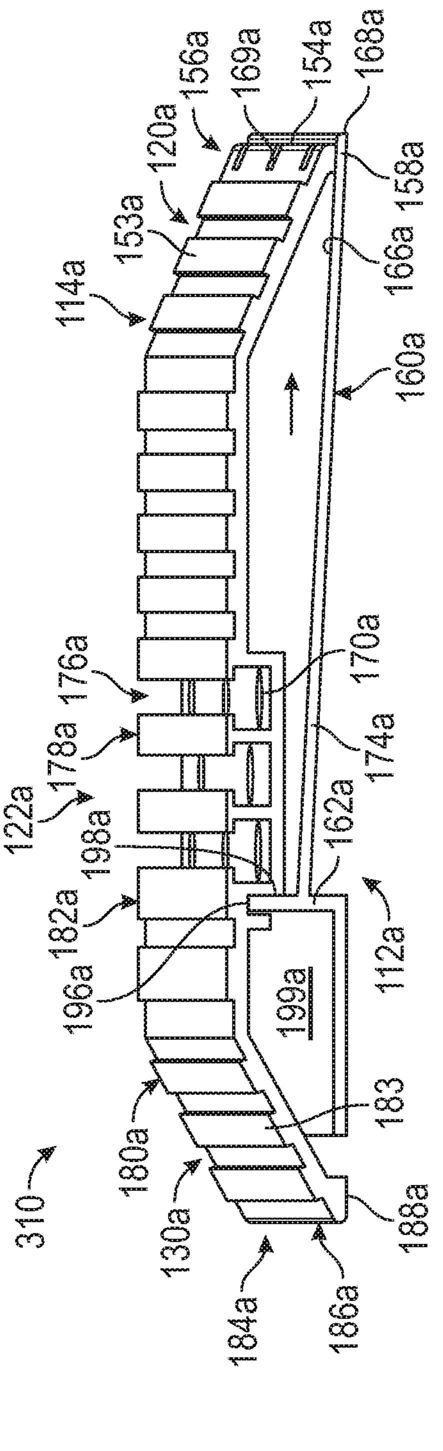
FIG. 10 is a cross-sectional view of the entry door drainable threshold of FIGS. 7-9.

FIG. 6 illustrates another embodiment of a door drainable threshold 210 shown with a roll up door 214 slightly open relative to the threshold 210. The threshold 210 is the same as the threshold 110, but sized differently to accommodate the roll up door 214.

FIGS. 7-10 illustrate a further embodiment of a door drainable threshold 310 without the door shown. Like elements to those shown and described with respect to the threshold 110 are shown with the same reference numbers, but with an "a" suffix. The prior description of the threshold 110 and these elements is incorporated herein. The threshold 310 is the same as the threshold 110, but is made of extruded aluminum and includes two elongated T-shaped ridges **178*a* and three elongated recesses 176*a* in the intermediate trough section 122*a*. Also, the configuration and number of apertures (e.g., slots) 170*a* is different in the threshold 310. Instead of circular, the slots 170*a* are long, narrow apertures (e.g., 2" long, 0.24" wide). Intermediate trough section 122*a* includes three slots 170*a*, two slots 170*a*, and three slots 170*a* in successive three elongated recesses 176*a*. Another difference is that the flat undersurface 158*a* of the front 154*a* of the threshold cap 114*a* abuts the upper surface 166*a* of the front 168*a* of the threshold ramp 112*a*, and the front 154*a* of the threshold cap 114*a* includes three water egress slots (e.g., weep or water evacuation locations) 169*a* that are longitudinally aligned and the same configuration (e.g., long, narrow apertures that are 2" long, 0.24" wide) as the two sets of three slots 170*a* in the intermediate trough section 122*a***.

Similar to as discussed above with respect to threshold 110 and FIGS. 3-5, the two-piece construction with threshold ramp **112*a* and a threshold cap 114*a* disposed over and on the threshold ramp 112*a* allows the threshold 110** to have a low profile, not to exceed ½ in. in height, and, thus, making it American Disabilities Act (ADA) compliant.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus, the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or"

unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. A drainable threshold, comprising:

a front section including one or more water egress apertures;

a trough section including a plurality of elongated T-shaped members and a plurality of recesses each formed in part by and between the elongated T-shaped members, the plurality of recesses including a plurality of apertures; and a water ramp member disposed under the trough section and the front section, whereby water falls down through the plurality of apertures of the plurality of recesses of the trough section, down the water ramp member, and out of the drainable threshold through the one or more water egress apertures, wherein the drainable threshold is configured to be used in one or more of a commercial application, an industrial application, a warehousing application, and a loading application.

2. The drainable threshold of claim 1, wherein the drainable threshold has a two-piece construction comprised of a threshold ramp and a threshold cap.

3. The drainable threshold of claim 1, wherein the drainable threshold includes an anti-skid profile.

4. The drainable threshold of claim 3, wherein the anti-skid profile includes one or more of ridges and bumps.

5. The drainable threshold of claim 1, wherein the drainable threshold includes a drainage flow rate of at least 2.3 gallons per minute per 3 foot section.

6. The drainable threshold of claim 1, wherein the front section includes an inclined upper surface and a horizontal upper surface.

7. The drainable threshold of claim 1, wherein the water ramp member includes an upper end and the trough section is disposed above the upper end of the water ramp member.

8. The drainable threshold of claim 1, wherein the drainable threshold is for a roll-up door.

9. The drainable threshold of claim 1, wherein apertures of the plurality of apertures of the trough section are aligned with the one or more water egress apertures of the front section.

10. The drainable threshold of claim 1, wherein the plurality of apertures of the trough section and the one or more water egress apertures of the front section are slots.

11. The drainable threshold of claim 1, further including a rear section.

12. The drainable threshold of claim 11, wherein the rear section includes an inclined upper surface and a horizontal upper surface with elongated ridges.

13. The drainable threshold of claim 12, wherein the rear section includes a rear having a rear supporting section with a flat undersurface that rests on underlying floor.

14. The drainable threshold of claim 12, wherein the drainable threshold has a two-piece construction including a threshold ramp and a threshold cap that together include the front section, trough section, and the water ramp member, the horizontal upper surface includes an underside having a downwardly extending vertical ridge and a downwardly extending rear wall that form an elongated receiving recess and the water ramp member includes an upper portion received in the elongated receiving recess to secure the threshold ramp and the threshold cap together.

15. The drainable threshold of claim 14, wherein the threshold ramp includes an elongated base flange that rests on an underlying floor.

16. The drainable threshold of claim 1, wherein the threshold has a height no greater than ½ in.

17. The drainable threshold of claim 1, wherein the threshold is made of extruded aluminum.

18. A method of using the drainable threshold of claim 1, comprising:

receiving water through the plurality of apertures of the trough section;

draining the water down the water ramp member;

emitting the water out of the drainable threshold through the one or more water egress apertures.

19. A drainable threshold, comprising:

a front section including one or more water egress apertures;

a trough section including a plurality of recesses with a bottom having a plurality of apertures; and a water ramp member disposed under and spaced from the bottom of the plurality of recesses of the trough section, whereby water falls down through the plurality of apertures of the trough section, down the water ramp member, and out of the drainable threshold through the one or more water egress apertures, wherein the drainable threshold is configured to be used in one or more of a commercial application, an industrial application, a warehousing application, and a loading application.

20. The drainable threshold of claim 19, wherein apertures of the plurality of apertures of the trough section are aligned with one or more water egress apertures of the front section.

21. The drainable threshold of claim 19, wherein apertures of successive recesses of the plurality of recesses being staggered relative to each other so that the apertures of successive recesses are not aligned with each other.

* * * * *